March 23, 1937. F. S. WRIGHT 2,074,603
DRINKING APPLIANCE FOR POULTRY AND THE LIKE
Filed July 8, 1935 2 Sheets-Sheet 2

Inventor:- Francis Stanley Wright.
Per:- George E. Folkes.
Attorney.

Patented Mar. 23, 1937

2,074,603

UNITED STATES PATENT OFFICE 2,074,603

DRINKING APPLIANCE FOR POULTRY AND THE LIKE

Francis Stanley Wright, Earlswood, England, assignor to Stocal Enamels Limited, Birmingham, England Application July 8, 1935, Serial No. 30,213
In Great Britain July 11, 1934

5 Claims. (Cl. 119—77)

The present invention relates to a drinking appliance for poultry and the like, and more particularly is concerned with the type of appliance comprising a bucket-like body or container having a handle and lip and cover sections associated with the mouth thereof, the said lip and cover sections adapting the appliance to function after the manner of a bird fountain when the container has been filled with liquid and is disposed in a horizontal position.

In appliances of the type aforesaid as heretofore constructed or proposed the cover section has been permanently installed in the mouth of the bucket and certain difficulties have been thereby experienced in the cleaning of the interior parts of the appliance.

The present invention has for its primary object to overcome the defects arising from the permanent fixing of the said cover section, and the invention comprises a drinking appliance of the type aforesaid wherein a subsidiary container is detachably mounted within the body of the bucket or primary container, said subsidiary container having a closed top and an opening in its wall or other part whereby, when the primary container is filled with water and the subsidiary container installed therein, the latter becomes filled with the water and the top thereof serves in association with the lip on the bucket or primary container to adapt the appliance when turned to a horizontal position to operate after the manner of a bird fountain.

The invention and certain modifications thereof will be hereinafter more particularly described with reference to the accompanying drawings.

The same numerals of reference indicate the same parts in the several figures of the drawings.

Figure 1:
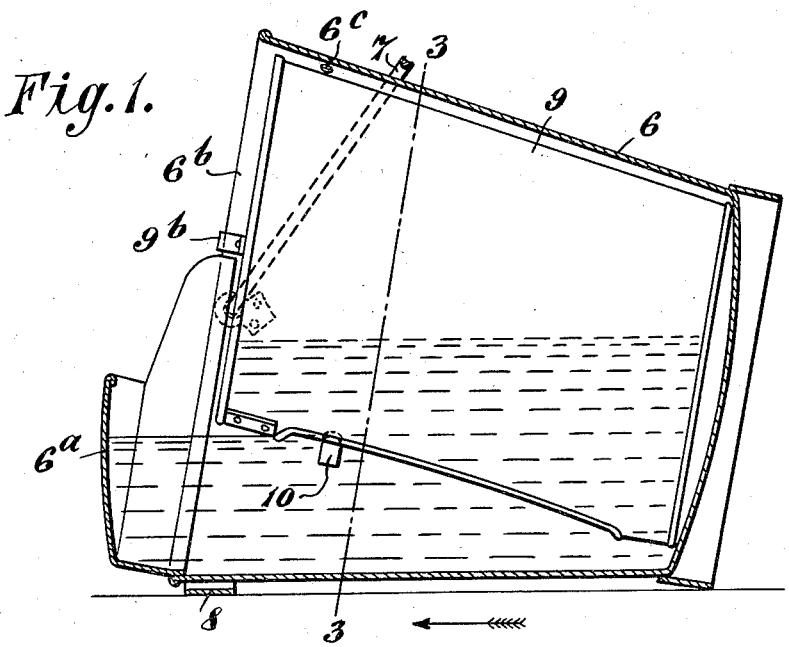
Figure 1 represents partly in side elevation and partly in longitudinal section one convenient embodiment of the invention, the appliance being shown in the horizontal position in which it is placed for use as a bird fountain.
Figure 2:
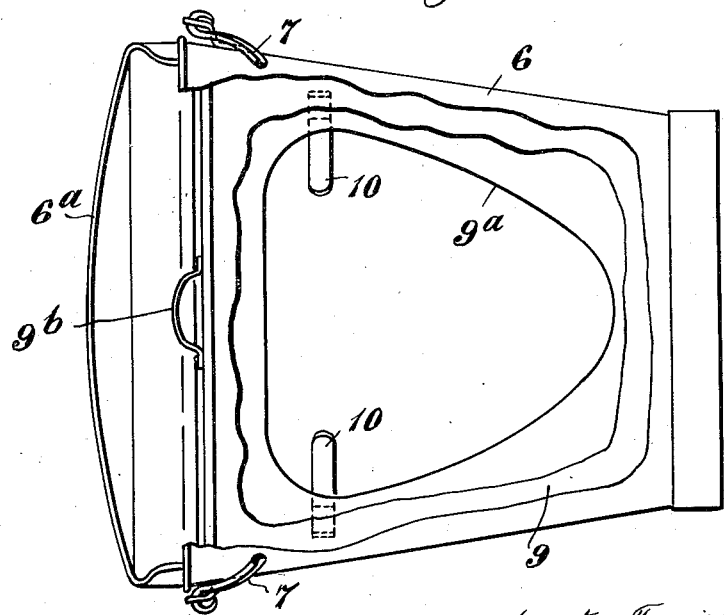
Figure 2 is a plan of the same, a portion of the handle and upper parts of the primary and subsidiary containers being broken away.
Figure 3:
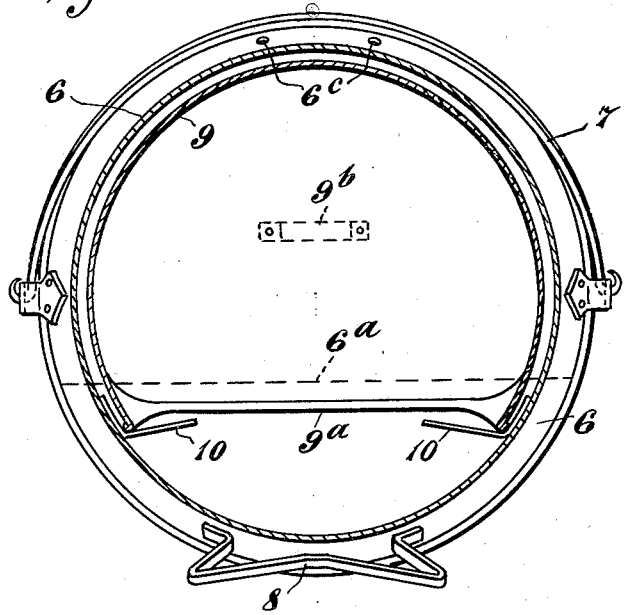
Figure 3 is a transverse section on the plane indicated by the dotted line 3—3 in Figure 1, looking in the direction of the arrow in the said Figure 1.

Referring first to the embodiment of the invention illustrated in Figures 1, 2 and 3, the appliance comprises a bucket-like container 6, herein referred to as the primary container, the said primary container being provided with a pivoted handle 7 and an outwardly protruding segmental hood or lip 6ª permanently associated with the mouth 6ᵇ thereof and constituting an extension of the body into which water from the main part flows when the appliance is placed horizontally.

A foot, or feet, is or are provided upon the bucket-like primary container 6 so that it may be disposed horizontally with the hood or lip 6ª situated at the lower part of the mouth, a suitable foot being constituted by a metallic bar such as 8 bent as is best seen in Figure 3 and located adjacent the mouth or fore-part of the primary container, the said bar acting to prevent a rocking motion of the appliance when in the horizontal position. The foot, or feet, may be otherwise disposed than at the fore-end of the appliance, as for example, at the rear end thereof.

The subsidiary container, denoted by the reference 9, is constituted by a vessel closed at top and bottom and the body whereof has a tapering or bucket-like formation the said tapering body being flattened on one side the flattened side being partially cut-away to provide the opening 9ª therein. The dimensions of this subsidiary container are such that it can be installed within the primary container and it is introduced thereinto and removed therefrom by a sliding motion, a handle 9ᵇ being provided at its upper or fore-end for facilitating its manipulation in these operations. The subsidiary container 9 is arranged in the primary container so that its flattened and apertured side is presented to that side of the primary container from which the hood or lip 6ª protrudes, that is to say to the part which is lowermost when the appliance is placed in the horizontal position for use as a bird fountain, and it is so located within the primary container, as for example by the two supporting lugs or tongue-like parts 10 that the top of the subsidiary container is overlapped by the hood or lip 6ª, that is to say, the front lower edge of the subsidiary container is in a plane below the top edge of the hood or lip when viewed horizontally in elevation.

The primary container 6 may be provided with holes or apertures 6ᶜ adjacent its open part which serve to determine the correct height to which it should be filled with water prior to installing the subsidiary container therein.

The subsidiary container 9 is introduced into the filled primary container or bucket 6 while the said bucket 6 is held or supported with its axis vertical and the liquid flows into and fills the subsidiary container.

When the assembled appliance is disposed horizontally there is a flow of water into the protruding hood or lip section 6ª, the appliance then functioning after the manner of a bird fountain.

Figure 4:
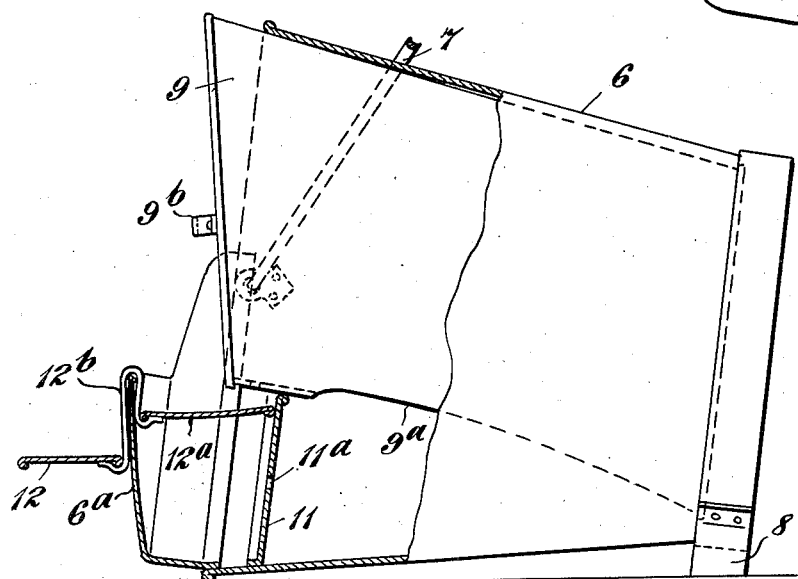
Figure 4 is a similar view to Figure 1 illustrating certain modifications in construction.

Instead of providing the lugs or tongues 10 for supporting the subsidiary container 9 in its proper location in the primary container 6 the said subsidiary container may, as is illustrated by Figure 4, be supported adjacent its fore-end by a partition-like part 11 fixed in the primary container and extending across the portion thereof in which it is disposed, the said partition having therein an aperture 11ª or a plurality of such apertures, to permit the requisite flow of liquid into the extension formed by the hood or lip 6ª when the appliance is horizontally disposed.

The partition 11 serves the further purpose of co-acting with the hood or lip 6ª to form a trough wherein any dirt or food from the birds' beaks may collect, and any such sediment is prevented by the partition 11 from entering the liquid in the main body of the bucket which is thus kept free from fouling.

Preferably the subsidiary container 9 is given such a shape that a portion of its top or fore-end protrudes above the open end of the primary container as shown in Figure 4, such shaping enabling it to contain a greater volume of water and avoid spilling when the subsidiary container is being inserted and furthermore as the birds not infrequently perch on the highest point of the rim of these appliances the location of this point as far forward as possible in relation to the water surface below it reduces the liability of the fouling of the water by excrement from the birds.

Figure 5:
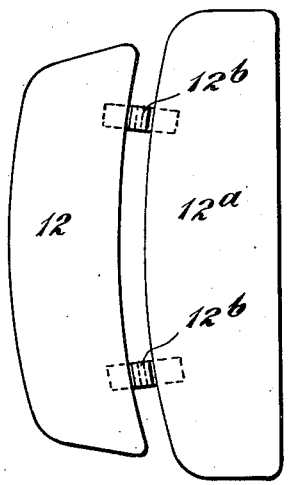
Figure 5 represents in plan a device hereinafter more particularly referred to for use in conjunction with the appliance and shown in Figure 4 in connection therewith.

To enable the appliance to be used by the smallest chickens and obviate the liability of their being drowned by falling into the water of the appliance there may be provided for use in conjunction with the appliance a device such as is shown in plan in Figure 5 detached and seen in section in situ on the appliance in Figure 4, the said device comprising two plate-like members, marked respectively 12 and 12ª, and connected together by metal strips 12ᵇ bent to an inverted U shape the said bent metal strips serving by the engagement of their inverted U-shaped portions with the upper edge of the hood or lip 6ª so to support the device thereon that the plate-like part 12 provides a platform extending across the hood or lip and at such a height in relation to the top edge thereof that the smallest chickens by hopping on to the platform can reach the water in the fount, while the plate-like part 12ª is located in the water in the hooded part or lip extension of the appliance and extends across the same at such a height that the depth of water above its upper surface is insufficient to drown a bird which may accidentally fall therein.

It is to be understood that I do not limit myself to the precise details of shape and construction of the parts described as the same may be varied without departing from the invention.

It will be appreciated that the provision of the subsidiary container which can be readily withdrawn considerably facilitates the cleaning of the appliance and that the filling of the primary container with water, which operation is performed with the subsidiary container removed therefrom, is effected without splashing and further the primary container can, when the subsidiary container is removed, be utilized for the ordinary purposes of a bucket.

It will further be appreciated that the hooded lip part serves, when the filled bucket, or the assembled appliance, is being carried to wholly prevent or greatly minimize the splashing of the water on to the person carrying the bucket and the splashing which occurs with the known constructions of fount which have to be completely inverted after filling is also avoided there being practically no splash in disposing this appliance in the horizontal position.

What I claim is:—

1. An improved drinking appliance for poultry and the like comprising a primary container, a hood-like part provided at one end of said primary container and a subsidiary container adapted to be introduced into and removed from the primary container, said subsidiary container being shaped so that when installed in a primary container which is charged with water and turned therewith to a substantially horizontal position it co-operates with the primary container to function after the manner of a barometric fountain.

2. An improved drinking appliance for poultry and the like comprising a primary container, a hood-like part provided at one end of said primary container and a subsidiary container adapted to be introduced into and removed from the primary container by a sliding motion, said subsidiary container being closed at its respective ends and having the body thereof of a contour corresponding with the major portion of the body of the primary container but flattened on one side, the flattened side having therein an aperture so that when the subsidiary container is installed in the primary container which is charged with water and turned into a substantially horizontal position it co-operates with the primary container to function after the manner of a barometric fountain.

3. In combination with a drinking appliance, according to claim 1, means for properly locating the subsidiary container relatively to the primary container when disposed therein.

4. A drinking appliance for poultry and the like comprising a primary container, a hood-like part provided adjacent to the open end of the primary container, a subsidiary container adapted to be introduced into and removed from the primary container, said subsidiary container being so shaped that when installed in the primary container which is charged with water and turned therewith to a substantially horizontal position, it co-operates with the primary container to function after the manner of a barometric fountain and a transversely disposed partition in the primary container for constituting a lodgment for the subsidiary container and for preventing sediment from gaining access to the liquid in the main part of the appliance.

5. In combination with a drinking appliance, according to claim 1, a device comprising two plate-like members and means for interconnecting said members, said interconnecting means being adapted to be supported on the free edge of the hood-like part with one of the plate-like members located external to the said part and the other on the inner side of the said part, the plate-like members providing a step which admits of the smallest birds drinking at the fountain without the risk of falling into the water and being drowned.

FRANCIS STANLEY WRIGHT.